(12) United States Patent
Schmanske et al.

(10) Patent No.: US 8,538,849 B2
(45) Date of Patent: Sep. 17, 2013

(54) METHODS AND SYSTEMS REGARDING VOLATILITY RISK PREMIUM INDEX

(75) Inventors: Michael Schmanske, New York, NY (US); Maneesh Deshpande, New York, NY (US); Rohit Bhatia, New York, NY (US); Yidong Ding, New York, NY (US); Pankaj Khandelwal, Jersey City, NJ (US)

(73) Assignee: Barclays Capital Inc., New York, NY (US)

( * ) Notice: Subject to any disclaimer, the term of this patent is extended or adjusted under 35 U.S.C. 154(b) by 0 days.

(21) Appl. No.: 13/190,655

(22) Filed: Jul. 26, 2011

(65) Prior Publication Data

US 2012/0023036 A1     Jan. 26, 2012

Related U.S. Application Data

(60) Provisional application No. 61/367,742, filed on Jul. 26, 2010.

(51) Int. Cl.
*G06Q 40/00* (2012.01)

(52) U.S. Cl.
USPC .......................................... 705/36 R; 705/35

(58) Field of Classification Search
None
See application file for complete search history.

(56) References Cited

U.S. PATENT DOCUMENTS

| | | |
|---|---|---|
| 2002/0116310 A1 | 8/2002 | Cohen |
| 2003/0225658 A1 | 12/2003 | Whaley |
| 2005/0102214 A1 | 5/2005 | Speth et al. |
| 2006/0059064 A1 | 3/2006 | Glinberg et al. |
| 2006/0100949 A1* | 5/2006 | Whaley et al. .............. 705/36 R |
| 2007/0219893 A1 | 9/2007 | Xu |
| 2009/0177592 A1 | 7/2009 | Glinberg et al. |
| 2009/0271325 A1 | 10/2009 | Wilson |
| 2010/0017345 A1 | 1/2010 | Hadi et al. |

OTHER PUBLICATIONS

Dynamic Estimation of Volatility Risk Premia and Investor Risk Aversion from Option-Implied and Realized Volatilities Tim Bollerslev, Michael Gibson, and Hao Zhou 2004-56.*
The Volatility Risk Premium in Index Options Fri, Apr. 17, 2009 | Jared Woodard.*
Equilibrium Index and Single-Stock Volatility Risk Premia Equilibrium Index and Single-Stock Volatility Risk Premia A. Buraschi, F. Trojani, A. Vedolin Date: 2009.*
International Search Report of PCT/US11/45325 dated Nov. 15, 2011.
http://www.cboe.com/micro/vol/defaults.aspx (3 pages), plus two linked articles: The Investable Volatility Index Description (8 pages), and The Investable Volatility Index Factsheet (3 pages).
Investable Volatility Index, Bank of America Merril Lynch, pp. 1-8, 2011 http://www.cboe.com/micro/vol/PDF/InvestableVolDescription.pdf.

* cited by examiner

*Primary Examiner* — William Rankins
(74) *Attorney, Agent, or Firm* — Cowan, Liebowitz & Latman, P.C.; Steven D. Underwood

(57) ABSTRACT

An exemplary aspect comprises receiving data related to an underlying asset; calculating values corresponding to near-term implied volatility and realized volatility for the underlying asset; and transmitting data sufficient to describe an index based on a difference between the values corresponding to the near-term implied volatility and the realized volatility for the underlying asset. Another exemplary aspect comprises receiving electronic data related to an underlying asset; calculating data sufficient to describe a plurality of call options and a plurality of put options related to the underlying asset and written on a first settlement date; crediting an account with proceeds from selling the call and put options; and debiting the account to settle one or more of the options that are in-the-money on a second settlement date. Other aspects are apparent from the description and claims.

17 Claims, 1 Drawing Sheet

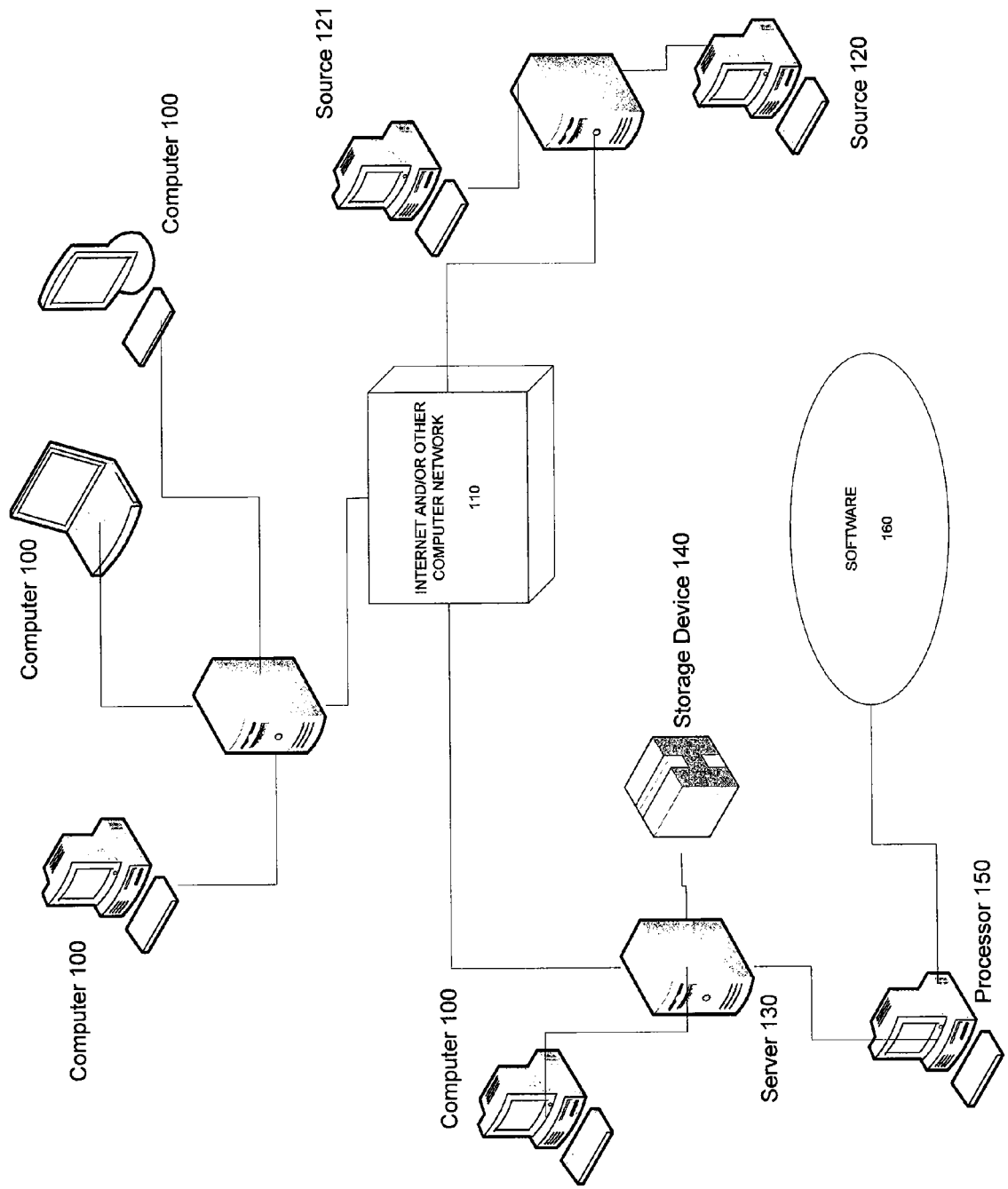

underlying asset; (b) calculating with a processing system a position in the options; and (c) transmitting data sufficient to describe an index based on a return from the position; wherein the processing system comprises one or more processors.

METHODS AND SYSTEMS REGARDING VOLATILITY RISK PREMIUM INDEX

CROSS-REFERENCE TO RELATED APPLICATIONS

The present application claims the benefit of U.S. Provisional Patent Application No. 61/367,742, filed Jul. 26, 2010. The entire contents of the above-listed application are incorporated by reference in their entirety into the present disclosure.

INTRODUCTION

One or more exemplary embodiments described herein comprise methods and systems related to providing an Index (one exemplary embodiment is referred to herein as the "Volatility Risk Premium Total Return Index") that aims to capture a difference between near-term implied volatility and realized volatility of an underlying asset (for example, common stock, commodity, currency, or a market index such as the S&P 500 Index ("SPX")). Such volatility difference is referred to herein as the "volatility risk premium."

In one or more exemplary embodiments, an Index measures the return from a monthly-rolling short position in a strip of front-month exchange-listed options on an underlying asset. The strip of options may include, for example, four calls and four puts with various out-of-the-money strikes, and its aggregate value is approximately market neutral at the start of each monthly rolling period with respect to directional movements of the underlying asset. Therefore, the level of income earned from selling the options at the beginning of each monthly rolling period is mostly driven by the implied volatility level of the underlying asset, whereas the option payoff amount deducted from the index performance at the end of each monthly rolling period is driven by the realized volatility of the underlying asset. As a result, the performance of the Index over each monthly rolling period is closely tied to the volatility risk premium of the underlying asset.

At least one exemplary aspect comprises a method comprising: (a) receiving electronic data related to an underlying asset; (b) calculating with a processing system data sufficient to describe a plurality of call options and a plurality of put options related to the underlying asset and written on a first settlement date; (c) crediting with the processing system an account with proceeds from selling the call and put options; and (d) debiting with the processing system the account to settle one or more of the options that are in-the-money on a second settlement date; wherein the processing system comprises one or more processors.

In various exemplary embodiments: (1) the number of call options in the plurality of call options is equal to the number of put options in the plurality of put options; (2) the call and put options are out-of-the-money when written; (3) the first settlement date is one month prior to the second settlement date; (4) the call and put options are front-month options; (5) the method further comprises calculating with a processing system data sufficient to describe a plurality of call options and a plurality of put options related to the underlying asset and written on the second settlement date; (6) the underlying asset comprises common stock; (7) the underlying asset comprises one or more commodities; (8) the underlying asset comprises currency; (9) the underlying asset comprises a market index; and (10) the market index is SPX.

At least one other exemplary aspect comprises a method comprising: (a) receiving electronic data describing a plurality of call options and a plurality of put options related to an underlying asset; (b) calculating with a processing system a position in the options; and (c) transmitting data sufficient to describe an index based on a return from the position; wherein the processing system comprises one or more processors.

In various exemplary embodiments: (1) the position is a monthly rolling short position; (2) the number of call options in the plurality of call options is equal to the number of put options in the plurality of put options; (3) the return is based on a difference between a level of income received from selling the options and an option payoff amount for the options; (4) the underlying asset comprises common stock; (5) the underlying asset comprises one or more commodities; (6) the underlying asset comprises currency; (7) the underlying asset comprises a market index; (8) the market index is SPX; and (9) the call and put options are front-month options.

At least one other exemplary aspect comprises a method comprising: (a) receiving electronic data related to an underlying asset; (b) calculating with a processing system values corresponding to near-term implied volatility and realized volatility for the underlying asset; and (c) transmitting data sufficient to describe an index based on a difference between the values corresponding to the near-term implied volatility and the realized volatility for the underlying asset; wherein the processing system comprises one or more processors.

In various exemplary embodiments: (1) the underlying asset comprises common stock; (2) the underlying asset comprises one or more commodities; (3) the underlying asset comprises currency; (4) the underlying asset comprises a market index; and (5) the market index is SPX.

Corresponding computer system and software aspects and embodiments also are encompassed within the present description, as will be apparent to those skilled in the art. For example, a corresponding computer system may include: (a) a receiving processor for receiving electronic data related to an underlying asset; (b) a calculating processor for calculating data sufficient to describe a plurality of call options and a plurality of put options related to the underlying asset and written on a first settlement date; (c) a crediting processor for crediting an account with proceeds from selling the call and put options; and (d) a debiting processor for debiting the account to settle one or more of the options that are in-the-money on a second settlement date.

Another corresponding computer system may include: (a) a receiving processor for receiving electronic data describing a plurality of call options and a plurality of put options related to an underlying asset; (b) a calculating processor for calculating a position in the options; and (c) a transmitting processor for transmitting data sufficient to describe an index based on a return from the position.

Another corresponding computer system may include: (a) a receiving processor for receiving electronic data related to an underlying asset; (b) a calculating processor for calculating with a processing system values corresponding to near-term implied volatility and realized volatility for the underlying asset; and (c) a transmitting processor for transmitting data sufficient to describe an index based on a difference between the values corresponding to the near-term implied volatility and the realized volatility for the underlying asset.

BRIEF DESCRIPTION OF THE DRAWING

FIG. 1 depicts an exemplary computer system used in conjunction with one or more embodiments.

DETAILED DESCRIPTION OF CERTAIN EXEMPLARY EMBODIMENTS

Certain illustrative embodiments are described in detail below. These details are provided solely for enablement and written description purposes. Those skilled in the art will understand that various details, aspects, and embodiments in addition to those described below are included within the scope of the invention.

1.1 Exemplary Input Data

In an exemplary embodiment, during the calculation hours of the Index, the following data may be used via snapshots every t (e.g., 15) seconds:

The bid and ask prices of the front-month options on the underlying asset listed on the relevant exchange (the "Option Exchange") of certain strikes as determined according to methodologies defined herein;

The most recent Cash Rate (examples in Appendix 2 below) relative to the Local Currency of the Underlying Asset (examples in Appendix 1 below).

Example: Underlying Asset is SPX, and Option Exchange is the Chicago Board Options Exchange ("CBOE"); Cash Rate may be the prevailing Fed Funds Effective Rate (Bloomberg: FED01L <Index>), or the most recent investment rate for 28-day U.S. Treasury bills as published by the U.S. Treasury on wwww.treasurydirect.gov prevailing Fed Funds Effective Rate (Bloomberg: FED10L USB4WIR <Index>).

1.2 Exemplary Historical Data

In an exemplary embodiment, historical data is available on a daily basis dating back to the Inception Date and starting with a base value of, say, 100.0000.

1.3 Exemplary Identifiers

TABLE 1

| Name | Type | ISIN | Symbol |
| --- | --- | --- | --- |
| Volatility Risk Premium Index | Total Return | TBD | TBD |

2 Exemplary Calculations 2.1 Exemplary Main Characteristics

In an exemplary embodiment, the Index may reflect the return of writing four front-month out-of-the-money call options (e.g., SPX call options) and four front-month out-of-the-money put options (e.g., SPX put options) on each monthly option settlement date on the Option Exchange (e.g., CBOE) against an interest bearing cash account. The premium earned from selling the options may be added to the cash account. On the following option settlement date, in-the-money written options may be cash-settled using available balance from the cash account, and a new set of front-month options may be written on the same day.

2.2 Exemplary Index Calculation 2.2.1 Exemplary Inception Date

In an exemplary embodiment, the Inception Date of the Index is the date on which the historical data begins.

2.2.2 Exemplary Rebalance Dates

For each calendar month from and including the month of the Inception Date, the final settlement day of options on the Underlying Asset listed on the Option Exchange is a Rebalance Date of the Index. The first Rebalance Date is the Inception Date.

In an exemplary embodiment, for each calendar month from (and including) the month of the Inception Date, the final settlement day of SPX options listed on CBOE is a Rebalance Date of the Index. The first Rebalance Date is the Inception Date. The Rebalance Date is generally the third Friday of each month, unless such Friday is a holiday, in which case the NYSE trading day immediately preceding such Friday will be the Rebalance Date.

2.2.3 Exemplary Selection of Options

In an exemplary embodiment, on each Rebalance Date, four call options (the "Component Calls") and four put options (the "Component Puts", and together with the Component Calls, the "Component Options"), may be selected as follows:

a) Define "Interval" as the following percentage corresponding to the closing level of the relevant volatility index (the "Volatility Benchmark") as of the previous trading day:

TABLE 2

| Last Volatility Benchmark Closing Level | Interval |
| --- | --- |
| 0 <= Volatility Benchmark <= 14 | 2% |
| 14 < Volatility Benchmark <= 18 | 2.5% |
| 18 < Volatility Benchmark <= 21 | 3% |
| 21 < Volatility Benchmark <= 28 | 4% |
| 28 < Volatility Benchmark | 5% |

In one or more exemplary embodiments, the relationship between the ranges of Volatility Benchmark closing levels and Interval percentages above may be as follows: Each Interval percentage represents a monthly volatility level, whereas the upper bound of each of the first four buckets for Volatility Benchmark closing levels may represent two times the annualized equivalent of such volatility level, rounded up to the nearest 1%. For example, for the 2.5% Interval, 2× the annualized equivalent may be $2 \times 2.5\% \times \sqrt{12} = 17.3\%$, which may be rounded up to 18%.)

For example, define "Interval" as the following percentage corresponding to the closing level of the VIX[1] index as of the previous trading day:

[1] VIX is the ticker symbol for the Chicago Board Options Exchange (CBOE) Market Volatility Index, a popular measure of the implied volatility of S&P 500 index options.

TABLE 3

| Last VIX Closing Level | Interval |
| --- | --- |
| 0 <= VIX <= 14 | 2% |
| 14 < VIX <= 18 | 2.5% |
| 18 < VIX <= 21 | 3% |
| 21 < VIX <= 28 | 4% |
| 28 < VIX | 5% |

In this example, the relationship between the ranges of VIX closing levels and Interval percentages above is as follows: Each Interval percentage represents a monthly volatility level, whereas the upper bound of each of the first four buckets for VIX closing levels represents two times the annualized equivalent of such volatility level, rounded up to the nearest 1%. For example, for the 2.5% Interval, 2× the annualized equivalent is 17.3%, which is rounded up to 18%.

b) Define "SET" as the official exercise-settlement value of the underlying asset on the Option Exchange on such Rebalance Date.

c) Identify all call options and put options listed on the Option Exchange expiring on the next Rebalance Date (the "Front-month Calls" and "Front-month Puts").

d) Define the strike price of each Front-month Call as a "Front-month Call Strike"; define the strike price of each Front-month Put as a "Front-month Put Strike".

e) The Component Calls are Front-month Calls with the following strike prices:

a. The strike price for the first Component Call, K(C,1), may be the lowest Front-month Call Strike greater than SET;

b. The strike price for the second Component Call, K(C,2), may be the lowest Front-month Call Strike greater than both SET×(1+Interval) and K(C,1); if no Front-month Call Strike satisfies such criteria, then K(C,2) may be set as the highest Front-month Call Strike;

c. The strike price for the third Component Call, K(C,3), may be the lowest Front-month Call Strike greater than both SET×(1+2×Interval) and K(C,2); if no Front-month Call Strike satisfies such criteria, then K(C,3) may be set as the highest Front-month Call Strike;

d. The strike price for the fourth Component Call, K(C,4), may be the lowest Front-month Call Strike greater than both SET×(1+3×Interval) and K(C,3); if no Front-month Call Strike satisfies such criteria, then K(C,4) may be set as the highest Front-month Call Strike.

In this exemplary embodiment, it is possible for two or more Component Calls to be the same contract as a result of identical strike prices determined using the exemplary methodology above.

f) The Component Puts are Front-month Puts with the following strike prices:

a. The strike price for the first Component Put, K(P,1), shall be the highest Front-month Call Strike less than SET;

b. The strike price for the second Component Put, K(P,2), shall be the highest Front-month Put Strike less than both SET×(1−Interval) and K(P,1); if no Front-month Put Strike satisfies such criteria, then K(P,2) shall be set as the lowest Front-month Put Strike;

c. The strike price for the third Component Put, K(P,3), shall be the highest Front-month Put Strike less than both SET×(1−2×Interval) and K(P,2); if no Front-month Put Strike satisfies such criteria, then K(P,3) shall be set as the lowest Front-month Put Strike;

d. The strike price for the fourth Component Put, K(P,4), shall be the highest Front-month Put Strike less than both SET×(1−3×Interval) and K(P,3); if no Front-month Put Strike satisfies such criteria, then K(P,4) shall be set as the lowest Front-month Put Strike;

(It is possible for two or more Component Puts to be the same contract as a result of identical strike prices determined using the methodology above.)

In an exemplary embodiment, on each Rebalance Date, the calls/puts selected on such Rebalance Date are referred to as the "New Component Calls/Puts" (together, the "New Component Options"), whereas the calls/puts selected on the previous Rebalance Date are referred to as the "Expiring Component Calls/Puts" (together, the "Expiring Component Options"). On any day that is not a Rebalance Date, the Component Calls/Puts of the Index are the New Component Calls/Puts selected as of the most recent Rebalance Date.

2.2.4 Number of Contracts to be Written

In an exemplary embodiment, the same Number of Contracts will be written for each of the New Component Calls/Puts. On each Rebalance Date (d), after the New Component Calls/Puts are identified, the Number of Contracts "N(new)" may be determined as follows:

$$N_{new} = \frac{Index_{d,SET}}{400 * SET_d}$$

Where:
Index(d,SET) is the SET Settlement Index Level on such Rebalance Date d, as defined hereinafter.
SET(d) is the official exercise-settlement value of the underlying asset on such Rebalance Date d (for example, SET(d) may be the CBOE official exercise-settlement value of the S&P 500 Index on Rebalance Date d).

In an exemplary embodiment, the formula above is designed to maintain a positive index value as long as the underlying asset does not appreciate more than 100% over the course of any single monthly rolling period. If the underlying asset does appreciate by more than 100% in any monthly rolling period, depending on the premium received and the strikes written, the index level may become negative due to the four Component Calls written at the beginning of such monthly rolling period. In such case the Index may be discontinued per Section 3.4.

2.2.5 Exemplary Index Composition

In an exemplary embodiment, for the purpose of calculating index levels, the following assumptions are made with respect to index composition.

On any day that is not a Rebalance Date, the Index is deemed to be comprised of a cash balance and short positions in N contracts of each Component Call and N contracts of each Component Put.

On any Rebalance Date, a) Prior to the time at which SET is published on such Rebalance Date, the Index is deemed to be comprised of a cash balance and short positions in N contracts of each Expiring Component Option. Because the Last Trading Day of Expiring Component Options is the trading day prior to the Rebalance Date, the values of the option positions can not be determined until SET is known.

b) After SET is published and prior to, for example, close of business on such Rebalance Date, the Index is deemed to be comprised of a cash balance only, after the prior cash balance has been reduced by the settlement amounts of the Expiring Component Options.

c) The New Component Options are deemed to be sold at their respective EOD Bid Prices (alternatively, any other observable measure of market prices such as volume weighted average prices (VWAP) or the average of last bid/last offer prices) on such Rebalance Date. As of the close of business on such Rebalance Date, the Index may be deemed to be comprised of a cash balance and short positions in N(new) contracts of each New Component Option. The cash balance is increased by the premium income generated by selling the New Component Options at the beginning of this period.

In these exemplary embodiments, with respect to any option contract and any trading day, the "EOD Bid Price" is the last bid price of such option contract on such trading day.

2.2.6 Index Level Calculation on Non-Rebalance Dates

In an exemplary embodiment, the Index Level at any time (t) on a calendar day (d), where d is not a Rebalance Date, is calculated as follows:

$$Index_t = Cash_{d-1} \times \left(1 + \frac{Rate_{d-1}}{360}\right) - N \times \sum_{i=1}^{4} C_{i,t} - N \times \sum_{i=1}^{4} P_{i,t}$$

Where:

Index(t) is the index level at time t;

Cash(d−1) is the Cash Balance as of the end of business on the calendar day prior to day d;

Rate(d−1) is the Cash Rate as of the end of business on the calendar day prior to day d;

N is the Number of Contracts for each Component Option, as determined on the last Rebalance Date prior to day d;

C(i, t) is the arithmetic average of the last bid price and last ask price of the ith Component Call as of time t;

P(i, t) is the arithmetic average of the last bid price and last ask price of the ith Component Put as of time t.

In certain exemplary embodiments, one may use:

$$Index_t = Cash_{d-1} \times \left(1 + \frac{USB4WIR_{d-1}}{360}\right) - N \times \sum_{i=1}^{4} C_{i,t} - N \times \sum_{i=1}^{4} P_{i,t} \quad (A)$$

Where:

USB4WIR(d−1) is the most recent investment rate for 28-day U.S. Treasury bills as published by the U.S. Treasury on wwww.treasurydirect.gov (Bloomberg: USB4WIR <Index>) as of the end of business on the calendar day prior to day d.

Or in other exemplary embodiments one may use:

$$Index_t = Cash_{d-1} \times \left(1 + \frac{FEDL01_{d-1}}{360}\right) - N \times \sum_{i=1}^{4} C_{i,t} - N \times \sum_{i=1}^{4} P_{i,t} \quad (B)$$

Where:

FEDL01(d−1) is the last available level of the Federal Funds Effective Rate (Bloomberg: FEDL01 <Index>) as of the end of business on the calendar day prior to day d.

Where the SPX is the underlying asset, all option prices in this description are US dollar prices with the $100 multiplier applied to each SPX index point.

2.2.7 Index Level Calculation on Rebalance Dates

In an exemplary embodiment, if day (d) is a Rebalance Date, (a) Immediately after SET is published on such Rebalance Date, the [Index Sponsor] shall calculate the "SET Settlement Index Level" of such Rebalance Date, or "Index(d, SET)", which represents the value of the Index when it is comprised entirely of cash:

$$Index_{d,SET} = Cash_{d-1} \times \left(1 + \frac{Rate_{d-1}}{360}\right) - N_{exp} \times \sum_{i=1}^{4} C_{i,SET} - N_{exp} \times \sum_{i=1}^{4} P_{i,SET}$$

except when Rebalance Date (d) is the Inception Date, then

Index$_t$=Index$_{d,SET}$=100.0000

Where, in addition to previously-defined terms:

N(exp) is the Number of Contracts of each Expiring Component Call/Put on Rebalance Date d;

C(i,SET) is the exercise-settlement amount of the ith Expiring Component Call, calculated as: $C_{i,SET}=100 \times MAX(0, SET_d - K_{C,i})$ P(i,SET) is the exercise-settlement amount of the ith Expiring Component Put, calculated as $P_{i,SET}=100 \times MAX(0, K_{P,i} - SET_d)$;

K(C,i) is the strike price of the ith Expiring Component Call; K(P,i) is the strike price of the ith Expiring Component Put.

(b) In an exemplary embodiment, at any given time (t) (e.g., at close of business ("EOD"), after all C(i,BID) and P(i,BID) as defined hereafter are known, the closing level of the Index is calculated as follows:

$$Index_{d,EOD} = Index_{d,SET} + N_{new} \times \sum_{i=1}^{4} (C_{i,BID} - C_{i,EOD}) + N_{new} \times \sum_{i=1}^{4} (P_{i,BID} - P_{i,EOD})$$

Where, in addition to previously defined terms:

N(new) is the Number of Contracts of each New Component Call/Put on Rebalance Date d;

C(i,BID) is the EOD Bid Price of the ith New Component Call on Rebalance Date d;

P(i,BID) is the EOD Bid Price of the ith New Component Put on Rebalance Date d; C(i, EOD) is the arithmetic average of the last bid price and last ask price of the ith New Component Call on Rebalance Date d;

P(i, EOD) is the arithmetic average of the last bid price and last ask price of the ith New Component Put on Rebalance Date d.

Alternatively, in an exemplary embodiment, one may use:

$$Index_t = Index_{d,SET} + N_{new} \times \sum_{i=1}^{4} (C_{i,VWAP} - C_{i,t}) + N_{new} \times \sum_{i=1}^{4} (P_{i,VWAP} - P_{i,t})$$

Where, in addition to previously defined terms:

$C_{i,VWAP}$ is the volume weighted average price of the ith New Component Call between 11:30 AM and 12:00 PM New York Time on Rebalance Date d;

$P_{i,VWAP}$ is the volume weighted average price of the ith New Component Put between 11:30 AM and 12:00 PM New York Time on Rebalance Date d;

$C_{i,t}$ is the arithmetic average of the last bid price and last ask price of the ith New Component Call as of time t; and $P_{i,t}$ is the arithmetic average of the last bid price and last ask price of the ith New Component Put as of time t.

2.2.8 End-of-day Cash Balance

In an exemplary embodiment, on any calendar day (d), where d is not a Rebalance Date, the Cash Balance at the close of business is calculated as:

$$Cash_d = Cash_{d-1} \times \left(1 + \frac{Rate_{d-1}}{360}\right)$$

In an exemplary embodiment, on any calendar day d, where d is a Rebalance Date, the Cash Balance at the close of business is calculated as:

$$Cash_d = Index_{d,SET} + N_{new} \times \sum_{i=1}^{4} C_{i,BID} + N_{new} \times \sum_{i=1}^{4} P_{i,BID}$$

2.3 Computational Accuracy

In an exemplary embodiment, the Index is published as figures rounded to four decimal places.

3 Exemplary Dissemination and Policies

3.1 Dissemination

In an exemplary embodiment, the Index is calculated in real time (e.g., every 15 seconds) if such day is not a Rebalance Date.

In an exemplary embodiment, on any Rebalance Date, no Index level other than the SET Settlement Index Level will be calculated before the relevant VWAP are known on the New Component Options. After such VWAP's are known, the Index is calculated in real time (15 Seconds) and disseminated until 4:00 PM New York Time on such Rebalance Date.

3.2 Delisting of Options on the Underlying Asset

In an exemplary embodiment, if one or more options included in the Index is no longer listed, the Index Sponsor may decide on the appropriate measures and notify at that time.

3.3 Consequences of an Index Disruption Event

In an exemplary embodiment, if an Index Disruption Event in relation to the options on the Underlying Asset exists on index dissemination days, then:

In an exemplary embodiment, an Index Sponsor may calculate the value of the index based on the most recent prior mid option prices published by the Option Exchange and the roll for that day will be carried to the next Index Business Day.

In an exemplary embodiment, if an exchange fails to open due to unforeseen circumstances, the Index Sponsor may determine not to publish the index for that day.

In an exemplary embodiment, in situations where an exchange introduces a holiday during the month of the Index calculation, the Index will not be published on such a holiday and the roll for that day will be carried to the next Index Business Day.

3.4 Discontinuation Of Index

In an exemplary embodiment, the Index may be discontinued if, on any Rebalance Date, the SET Settlement Index Level is less than or equal to zero. In such a case the Index Sponsor may cease calculating and publishing index levels, and the Index deemed to be terminated on such Rebalance Date.

One or more exemplary embodiments described herein comprise computer components and computer-implemented steps that will be apparent to those skilled in the art. For example, calculations and communications can be performed electronically, and results can be displayed using a graphical user interface.

An exemplary such system is depicted in FIG. 1. Computers 100 communicate via network 110 with a server 130. A plurality of sources of data 120-121 also communicate via network 110 with a server 130, processor 150, and/or other components operable to calculate and/or transmit information. The server 130 may be coupled to one or more storage devices 140, one or more processors 150, and software 160.

Exemplary data used in the system may comprise option-related data, Index-related data, and contract and settlement related communications.

Calculations described herein, and equivalents, are, in one or more exemplary embodiments, performed entirely electronically.

Other components and combinations of components may also be used to support processing data or other calculations described herein as will be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, or in combination, processing and decision-making may be performed by functionally equivalent circuits such as a digital signal processor circuit or an application specific integrated circuit.

Many routine program elements, such as initialization of loops and variables and the use of temporary variables, are not described herein. Moreover, it will be appreciated by those of ordinary skill in the art that unless otherwise indicated, the particular sequence of steps described is illustrative only and can generally be varied without departing from the scope of the invention. Unless otherwise stated, the processes described herein are unordered—that is, the processes can be performed in any reasonable order.

All steps described herein will be understood by those skilled in the art as being capable of implementation by software, where feasible. Moreover, such software will be understood by those skilled in the art to be storable on a non-transitory computer readable medium and implementable by one or more computer processors.

While this invention has been described in conjunction with the exemplary aspects embodiments outlined herein, many alternatives, modifications, and variations will be apparent to those skilled in the art. Accordingly, exemplary aspects and embodiments of the invention, as set forth herein, are intended to be illustrative, not limiting. Various changes may be made without departing from the spirit and scope of the invention.

APPENDIX 1

Examples of Underlying Assets

| Underlying Asset | Local Currency | Option Exchange | Volatility Benchmark |
|---|---|---|---|
| S&P 500 Index ("SPX") | USD | CBOE | CBOE SPX Volatility Index ("VIX") |
| Euro STOXX 50 Index ("SX5E") | EUR | Deutsche Borse | VSTOXX Index ("V2X") |
| SPDR Gold Trust ETF ("GLD") | USD | CBOE | CBOE Gold ETF VIX Index ("GVZ") |
| United States Oil Fund LP ETF ("USO") | USD | CBOE | CBOE Oil ETF VIX Index ("OVX") |
| Gold | USD | CME | CBOE/COMEX Gold Volatility Index ("GVXX") |

APPENDIX 1-continued

Examples of Underlying Assets

| Underlying Asset | Local Currency | Option Exchange | Volatility Benchmark |
|---|---|---|---|
| Crude Oil (WTI) | USD | CME | CBOE/NYMEX Crude Oil (WTI) Volatility Index ('OIV") |
| Euro Currency (EUR) | USD | CBOE | CBOE Euro Currency Volatility Index ("EVZ") |
| Apple Inc. common stock ("AAPL") | USD | CBOE | CBOE Apple VIX Index ("VXAPL") |

APPENDIX 2

Examples of Cash Rates

| Local Currency | Cash Rate |
|---|---|
| USD | Latest investment rate for 28-day U.S. Treasury bills as published by the U.S. Treasury on wwww.treasurydirect.gov (Bloomberg: USB4WIR <Index >) |
| EUR | Euro Overnight Index Average (EONIA Index) |

We claim:

1. A method comprising:
   (a) receiving electronic data related to an underlying asset;
   (b) calculating by a processing system values corresponding to near-term implied volatility and realized volatility for said underlying asset; and
   (c) transmitting data sufficient to describe an index based on a difference between said values corresponding to said near-term implied volatility and said realized volatility for said underlying asset;
   wherein said electronic data related to said underlying asset comprises data describing a plurality of call options and a plurality of put options related to said underlying asset, and
   wherein said processing system comprises one or more processors.

2. A method as in claim 1, wherein said underlying asset comprises common stock.

3. A method as in claim 1, wherein said underlying asset comprises one or more commodities.

4. A method as in claim 1, wherein said underlying asset comprises currency.

5. A method as in claim 1, wherein said underlying asset comprises a market index.

6. A method as in claim 5, wherein said market index is SPX.

7. A method as in claim 1, wherein said index measures a return from a monthly-rolling short position in a strip of front-month exchange listed options on said underlying asset.

8. A method as in claim 7, wherein said strip of options comprises an equal number of call and put options having a plurality of out-of-the-money strikes.

9. A method as in claim 7, wherein an aggregate value of said strip of options is approximately market neutral at the beginning of each monthly rolling period with respect to directional movements of said underlying asset.

10. A non-transitory computer readable storage medium storing software operable to cause a computer system in communication with said storage medium to perform the following steps:
    (a) receive electronic data related to an underlying asset;
    (b) calculate values corresponding to near-term implied volatility and realized volatility for said underlying asset; and
    (c) transmit data sufficient to describe an index based on a difference between said values corresponding to said near-term implied volatility and said realized volatility for said underlying asset,
    wherein said electronic data related to said underlying asset comprises data describing a plurality of call options and a plurality of put options related to said underlying asset.

11. A non-transitory computer readable storage medium as in claim 10, wherein said index measures a return from a monthly-rolling short position in a strip of front-month exchange listed options on said underlying asset.

12. A non-transitory computer readable storage medium as in claim 11, wherein said strip of options comprises an equal number of call and put options having a plurality of out-of-the-money strikes.

13. A non-transitory computer readable storage medium as in claim 11, wherein an aggregate value of said strip of options is approximately market neutral at the beginning of each monthly rolling period with respect to directional movements of said underlying asset.

14. A computer system comprising:
    (a) a receiving processing unit that receives electronic data related to an underlying asset;
    (b) a calculation processing unit that calculates values corresponding to near-term implied volatility and realized volatility for said underlying asset; and
    (c) a transmission unit that transmits data sufficient to describe an index based on a difference between said values corresponding to said near-term implied volatility and said realized volatility for said underlying asset,
    wherein said electronic data related to said underlying asset comprises data describing a plurality of call options and a plurality of put options related to said underlying asset.

15. A computer system as in claim 14, wherein said index measures a return from a monthly-rolling short position in a strip of front-month exchange listed options on said underlying asset.

16. A computer system as in claim 15, wherein said strip of options comprises an equal number of call and put options having a plurality of out-of-the-money strikes.

17. A computer system as in claim 15, wherein an aggregate value of said strip of options is approximately market neutral at the beginning of each monthly rolling period with respect to directional movements of said underlying asset.

* * * * *